A. B. CARLL.
REAR AXLE CONSTRUCTION FOR AUTOMOBILE TRUCKS.
APPLICATION FILED APR. 3, 1918.

1,318,132. Patented Oct. 7, 1919.
3 SHEETS—SHEET 1.

Addison B. Carll, INVENTOR,

WITNESSES
Howard D. Orr.
H. T. Chapman.

BY
ATTORNEY

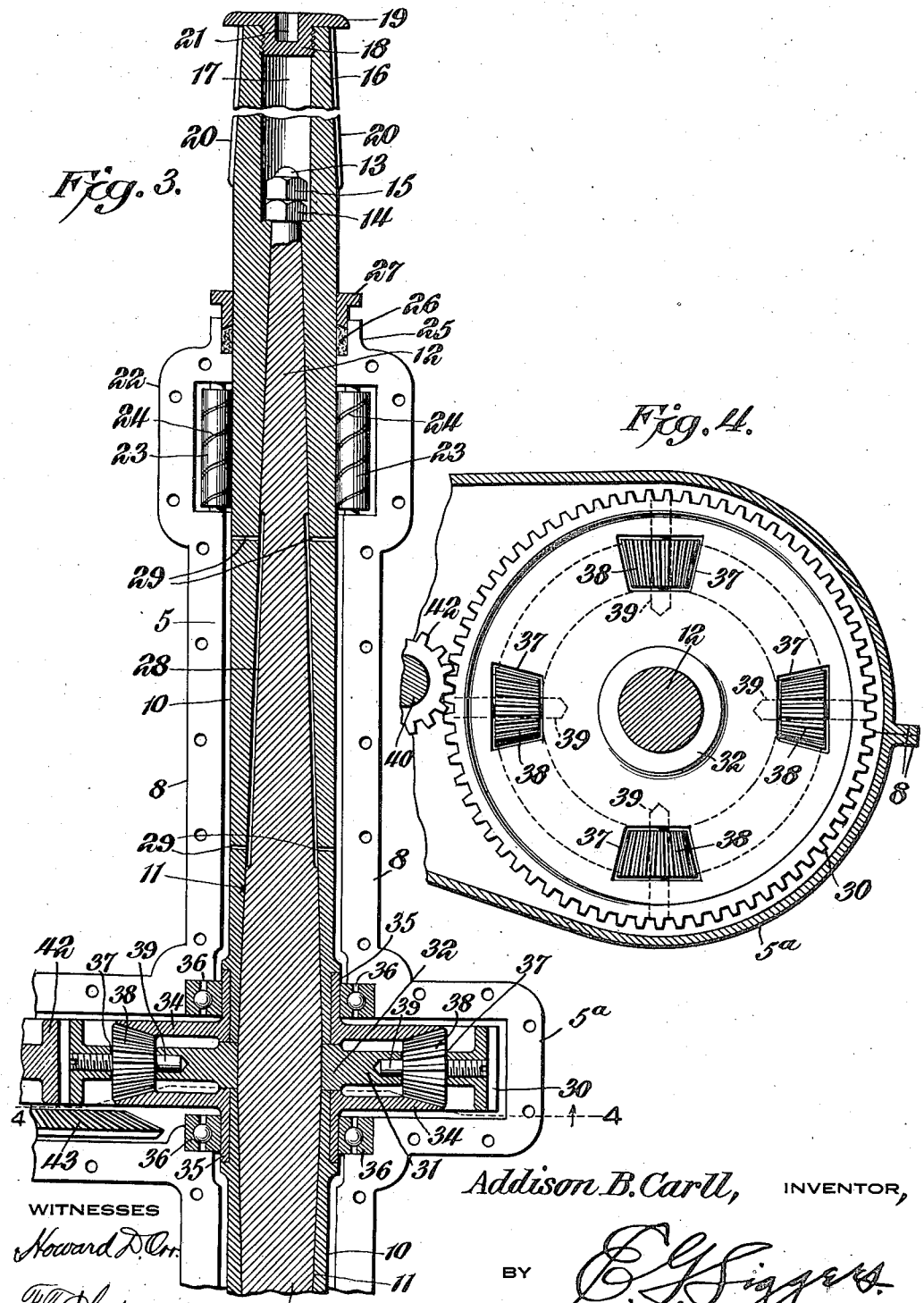

A. B. CARLL.
REAR AXLE CONSTRUCTION FOR AUTOMOBILE TRUCKS.
APPLICATION FILED APR. 3, 1918.
1,318,132.
Patented Oct. 7, 1919.
3 SHEETS—SHEET 3.
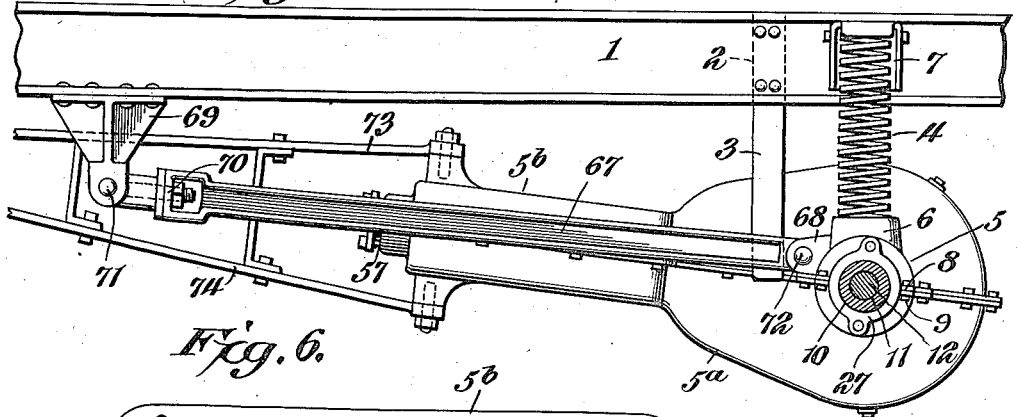
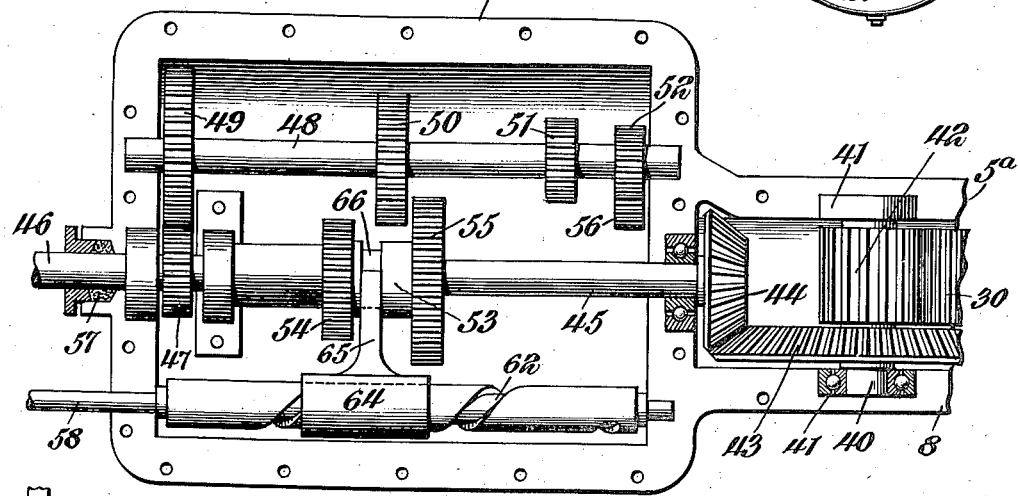
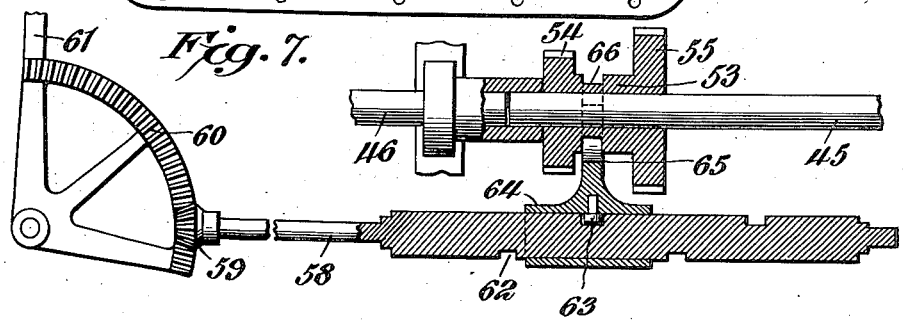
WITNESSES
Howard D. Orr.
H. T. Chapman.
Addison B. Carll, INVENTOR,
BY E. G. Siggers
ATTORNEY

UNITED STATES PATENT OFFICE.

ADDISON B. CARLL, OF NEW YORK, N. Y.

REAR-AXLE CONSTRUCTION FOR AUTOMOBILE-TRUCKS.

1,318,132.  Specification of Letters Patent.  Patented Oct. 7, 1919.

Application filed April 3, 1918. Serial No. 226,453.

*To all whom it may concern:*

Be it known that I, ADDISON B. CARLL, a citizen of the United States, residing at New York, in the county of New York and State of New York, have invented a new and useful Rear-Axle Construction for Automobile-Trucks, of which the following is a specification.

This invention has reference to rear driving axle construction, for automobile trucks, and the mechanism closely associated thereto, and its object is to provide a construction of the parts which will give great driving power and be of very strong and simple construction, easily assembled and taken apart.

The invention has especially to do with the construction of the rear driving axle mechanism and is such as to obviate the necessity of using chains or worms, the invention contemplating the use of a broad square face spur gear mounted on the axle assembled with such assembly of sufficient strength to be self-supporting and with all bearings running in oil or grease in a common case.

Heretofore, bevel spur gears only have been mounted on the rear axle and such gears and the axle construction appertaining to them have been suitable only for light trucks and pleasure cars, while for heavy trucks chains or worms have been almost exclusively used.

The advantage therefore, of this invention, in the axle construction with broad square face spur gear for strength, driven by a small spur pinion for power, will be readily understood and such an arrangement is believed to represent a decided and desirable improvement with its novelty evidenced by the fact that the arrangement of the invention has not heretofore been used.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 3 is a longitudinal horizontal section of a portion of the axle drawn on a larger scale than Fig. 1.

Fig. 4 is a section on the line 4—4 of Fig. 3.

Fig. 5 is a side elevation, with a portion of the axle in section, of the structure shown in Fig. 1 and some additional parts not shown in Fig. 1, the rear axle being shown in cross section.

Fig. 6 is a plan view of the transmission gearing and a part of the gearing connecting the transmission gearing to the differential, the top member of the casing being removed and some parts being shown in section.

Fig. 7 is a longitudinal horizontal section of a portion of the transmission gearing with some parts shown in elevation and the view being continued to take in the controlling means for setting the transmission gearing into different positions.

Figures 1, 2:
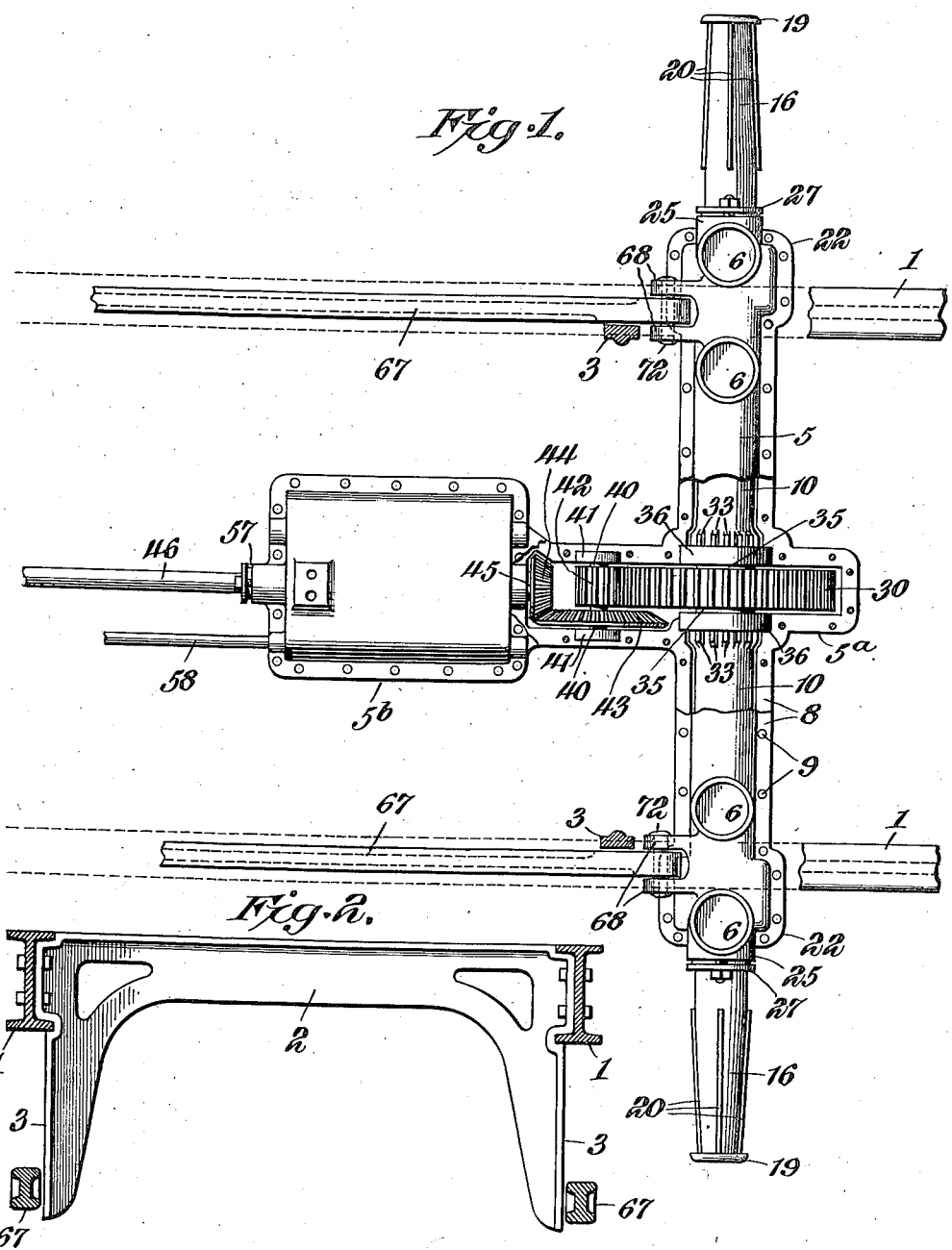
Figure 1 is a plan view of a rear axle embodying the invention and also showing a portion of the gear drive, the casing of the rear axle being broken away in part to expose the gearing.
Fig. 2 is a cross section of a portion of the chassis showing a bracket for absorbing some of the side swing.

Referring to the drawings, there is shown side beams 1 of a chassis frame which may be taken as indicative of any suitable form of chassis frame. Near the rear end of the chassis there is secured between the beams 1 an arch bracket 2 with drop legs 3 designed to absorb or prevent side swing.

Carrying the rear end of the chassis through the intermediary of coiled springs 4 is an axle casing 5, said casing being provided with bosses or with sockets 6 on top receiving the lower ends of the springs 4, which are upright, while the upper ends of the springs engage in holders 7 attached to the side beams of the chassis.

The casing 5, is a multi-part casing consisting of two or more parts with meeting flanges 8 held together by bolts or other fastening devices 9 so that in case of necessity one member of the casing may be removed from the other to give access to parts contained within the casing, for the purpose of inspection or repair or cleansing.

In most part housed within the casing 5 is a hollow two-part axle 10, the two parts of the axle being alike and hence a description of one part will apply to the other part. The hollow axle parts extend from a point close to the midline of the vehicle outwardly as far as necessary. Each axle section from its inner end to a point near the outer end has a taper bore 11 in which is lodged a corresponding end of a solid taper axle 12 terminating at each outer end, of which but one is shown in the drawings, in a threaded axial extension 13 to which there is applied a holding nut 14 and a lock nut 15. The solid taper axle 12 is shorter than the combined length of the two hollow axle sections 10, which latter each terminate in a wheel spindle 16 with an enlarged bore 17 capable of receiving the nuts 14 and 15 and a suitable tool by means of which these nuts may be screwed up tight. The outer end of each spindle 16 is tapped for the reception of a screw plug 18 having a flange 19 at the outer end so that the screw plug serves as a cap nut for holding a wheel upon the spindle 16. The wheel, however, is not shown in the drawings since it forms no part of the invention. The spindle 16 is provided with exterior keys 20 in the form of shallow ribs which may be integral with the spindle. The plug or cap nut 18 is provided with an axial socket 21 which may be of square or other suitable non-circular shape for the reception of a manipulating tool.

The casing 5 at each outer end has an annular enlargement 22 in which there is lodged a circular series of antifriction rollers 23 preferably provided with spiral grooves 24. The special construction of these rollers forms no part of the present invention and therefore no particular description thereof is given.

The casing 5 is designed to receive and retain lubricant and in order to prevent the escape of lubricant from the casing where the hollow axle emerges therefrom, the casing is there formed with a socket or receptacle 25 in which packing 26 is lodged, and held by a packing gland 27. Certain parts of the solid axle 12 are reduced in diameter as shown at 28 and passages 29 traverse the hollow axle to conduct lubricant from the casing 5 into the space 28 for distribution between the solid and hollow axle parts, since, as will hereinafter appear, the two parts 10 of the hollow axle may turn independently of each other and of the solid axle connecting them under certain conditions.

Mounted on the solid axle 12, midway of the length thereof, is a square face gear wheel 30 provided with a web 31 and a hub 32, the latter being traversed by the mid portion of the axle 12 but capable of turning thereon. The inner ends of the axle sections terminate at the hub 32 or so close thereto that friction between the parts may be eliminated to a great extent without producing looseness. Immediately adjacent to the inner ends the axle sections 10 are each formed with shoulders in which are formed an annular series of notches or key seats 33. Mounted on the inner ends of the axle sections are bevel gear wheels 34 having extended hubs 35 projecting from the gear wheels on the sides thereof remote from the gear wheel 30, these hubs being formed to bear against and fit into the notched shoulders 33. The hubs 35 each carry one member of a ball bearing structure 36, the other member being mounted in the casing 5. The ball bearing structure 36 may be of any approved form and hence needs no particular description.

The web 31 of the gear wheel 30 may be a solid web and is provided with an annular series of passages 37 therethrough, in each of which is located a bevel pinion 38 held in place by a bevel pin 39 radial to the gear wheel 30 and threaded into the web 32 with the outer extremity made to conform to the teeth of the gear wheel 30. This may be done by screwing the pins through the gear teeth as indicated and milling the teeth into the outer ends of the pins, thereby preventing said pins from unscrewing and making the gear teeth continuous. The gear wheels 34 and the pinions 38 are in constant mesh. The casing 5 has an enlarged continuation $5^a$ housing the gear wheels 30 and 34, and provided with recesses for the ball bearings 36. Traversing the housing extension $5^a$ is a journal 40 supported at the ends in antifriction journal bearings 41, shown as of the ball type, although not necessarily of such type. Fast to the journal 40 is a square face pinion 42 meshing with the square face gear wheel 30. The journal 40 also carries a large bevel gear wheel 43 within the housing extension $5^a$ and this bevel gear wheel is in mesh with a bevel pinion 44 upon one end of a shaft 45, which shaft constitutes a drive shaft and may be coupled to another shaft 46 constituting the crank shaft of the power unit of the vehicle.

In order to transmit power from the crank shaft 46 to the drive shaft 45 at different rates and directions, there is provided transmission gearing which, in most part, may follow the usual construction. A simple type of transmission gearing is shown in the drawings and is lodged in a further continuation $5^b$ of the casing 5, although it may be separate from it and close to the engine, thereby following the usual practice. In the construction shown the casing $5^b$, $5^a$ and 5 are of two parts only flanged and bolted longitudinally through the center of all the bearings, wherefore the lower half may be removed and the mechanism inspected.

The particular type of transmission gearing includes a pinion 47 fast on the crank shaft 46 and located within the casing 5ᵇ. Also within the casing 5ᵇ is a countershaft 48 parallel with the shafts 45 and 46 which are in alinement with each other. On the countershaft 48 is a gear wheel 49 meshing with the pinion 47. The countershaft 48 also carries other gear wheels 50, 51 and 52. The shaft 45 has on it the sleeve 53 with gear wheels 54 and 55 thereon. These gear wheels are capable of engaging with the gear wheels 50, 51 and 52 in a chosen order, the gear wheel 52 having an idler pinion 56 meshing therewith to be engaged by the gear wheel 55 when it is desired to reverse the direction of travel of the vehicle, the other gear wheels being employed to drive the vehicle forwardly at different speeds as is customary in the transmission gearing. The shaft 46 extends through a stuffing box 57 to prevent escape of lubricant with which the casing 5ᵇ is provided.

Extending through the casing 5ᵇ in parallel relation to the shaft 45 is another shaft 58 carried beyond the forward end of the casing 5ᵇ and there provided with a bevel pinion 59 engaged by a bevel segment 60 under the control of a lock lever 61 which may be assumed to extend to a point within reach of an operator or be provided with a reach rod for the same purpose. The shaft 58 is enlarged within the casing 5ᵇ and is provided with a helical groove 62 receiving a roller 63 carried by a sleeve 64 within the latter, the sleeve 64 being capable of sliding along the enlarged portion of the shaft 58. The sleeve 64 is provided with a forked extension 65 projecting from one side thereof and engaging an annular groove 66 in the sleeve 53.

By rocking the segment 60 in the proper direction and to the proper extent the gear wheels 54 and 55 are simultaneously shifted to engage the desired ones of the gears 50, 51 and 56, the arrangement being such that the vehicle may be driven forwardly or rearwardly.

The rear axle is held in place by radius bars 67, each connected at one end to ears 68 on the casing 5 and at the other end to a bracket 69 depending from an appropriate one of the side beams 1 of the chassis. The radius bars 67 perform the usual function of radius bars or rods in automobiles.

The radius bars 67 are each connected to the corresponding brackets 69 to a swivel 70, the direct connection to the bracket being through a pivot 71 and the other end of each bar is connected to the ears 68 by a pivot 72, thus permitting great freedom of movement of the rear axle so far as up and down movements of the axle are concerned, either one or both ends, but rigidly bracing the axle against movements about an upright axis.

Connected to the front of the casing member 5ᵇ is a torsion frame 73 having a lower bar 74 removable from the lower casing section and other parts so that when it is desired to remove the lower casing section such operation may be easily performed without disturbing other parts of the mechanism.

For heavy duty, helical springs directly supporting the chassis from the rear axle are superior to other types of springs, which latter answer for light vehicles, and hence the invention contemplates the use of the springs 4 instead of elliptical or semi-elliptical leaf springs, although leaf springs may be used if desired.

When the shaft 45 is being rotated motion is transmitted therefrom to the large bevel gear wheel 43 through the bevel pinion 44, thus largely increasing the power of the bevel gear wheel 43. The power from the bevel gear 43 is transmitted from the journal 40 to the square face pinion 42 and this in turn transmits power of still greater effect to the large square face gear wheel 30. The action of the gear wheel 30 upon the two hollow axle members through the pinions 38 and gear wheels 34 is the same as the ordinary differential except that the differential of this invention is far more powerful and sturdy than is the case with the ordinary differential composed wholly of bevel gears. Moreover, the rear drive has the advantage over chain drives frequently employed for heavy duty in that no parts are exposed and the entire driving mechanism may be bathed in oil or grease. The square face bevel gear drive has an advantage over worm gear drives used for heavy duty in that the parts are less susceptible of wear and there is considerable loss in power in transmission in worm gearing, which loss is not present in square face spur gearing.

The rear axle assemblage has the advantage of rigidity, the two axle members being held strictly in alinement and against sagging by the solid inclosed axle and by the nuts at the ends of the solid axle housing in the axle members. These nuts constitute the sole means of holding the parts of the rear axle together and so long as these nuts hold there is nothing whatever to become loose, and furthermore, there are no exposed parts past which lubricant may escape, wherefore, all running parts needing lubrication may be constantly bathed therein, the inclosing casing being common to all such running parts with respect to the rear axle assemblage, the differential, the transmission and the intermediate gearing.

What is claimed is:—

1. In a gear drive and axle construction for automobiles, the combination with a rear or drive-axle assembly, of a bevel pinion having its axis of rotation substantially radial to the axis of rotation of the driving axle, a bevel gear wheel in intermeshing relation with the bevel pinion, a square face spur pinion concentric with and fixed to the bevel gear wheel, a square face spur gear wheel mounted on the rear or driving axle assembly in constant mesh with the square face spur pinion and concentric with the rear axle, and differential means for transmitting power from the square face spur gear wheel to the driving parts of the axle.

2. In a gear drive and axle construction for automobiles, a bevel pinion and a bevel gear wheel in intermeshing relation, a square face spur pinion concentric with and fixed to the bevel gear wheel, a rear or driving axle assembly including hollow axle members and a tapered axle member interior to the hollow axle members, a square face spur gear mounted on the interior axle member and constantly meshing with the square face spur pinion, bevel gear wheels fixed to the inner ends of the hollow axle members, other bevel gear wheels carried by the square face spur gear and meshing with the bevel gear wheels on the hollow axle members, and vehicle wheels fastened on the outer ends of the hollow axles.

3. In a gear drive and axle construction for automobiles, a bevel pinion and a bevel gear wheel in intermeshing relation, a square face spur pinion concentric with and fixed to the bevel gear wheel, an axle assembly including hollow axle members and a taper axle member interior to the hollow members and joining them, a square face spur gear mounted on the interior axle member, bevel gear wheels mounted on the inner ends of the hollow axle members, bevel pinions carried by the square face spur gear and meshing with the bevel gears mounted on the hollow axle members, means within the hollow axle members for retaining them on the inner axle member in proper relation lengthwise of the latter, and nuts on the outer ends of the hollow axle members for locking vehicle wheels thereon and inclosing the central axle member grease tight within the hollow axle members.

4. The combination with a drive axle assembly, of a square face spur gear wheel connected to the drive axle concentric therewith, a square face spur pinion in constant mesh with the gear wheel, a bevel gear wheel fast to and concentric with the spur pinion, and a bevel pinion in constant mesh with the bevel gear wheel, the axis of rotation of the bevel pinion being in substantially radial relation to the drive axle.

5. In drive axle construction for automobiles, a solid oppositely tapered axle, hollow internally tapered axle members mounted on the solid axle and connected thereby, and differential gearing for driving the hollow axle members.

6. In drive axle construction for automobiles, a solid oppositely tapered axle, hollow internally tapered axle members mounted on the solid axle and connected thereby, and differential gearing for driving the hollow axle members, the hollow axle members projecting beyond the ends of the solid axle member and the latter having means within the hollow axle members for holding the latter on said solid member.

7. In drive axle construction for automobiles, a one-piece axle tapering from the middle portion toward the ends, hollow axle members with the interior correspondingly tapered and mounted on the one-piece axle member, said hollow members having wheel receiving spindles projecting beyond the corresponding ends of the one-piece axle member and the latter having fastening means within the spindles for holding the hollow axle members on the one-piece axle member, and differential gearing comprising bevel gear wheels mounted on the inner ends of the hollow axle members, a square face spur gear mounted on the one-piece axle member between the inner ends of the hollow axle members, bevel pinions carried by the spur gear wheel and meshing with the bevel pinions on the hollow axle members, and driving gear for the spur gear wheel.

8. In drive axle construction for automobiles, an axle assembly comprising separate hollow axle members with hollow wheel carrying spindles at their outer ends, an interior axle member extending through both of the hollow members and stopping short of the outer ends thereof, said interior axle member carrying and joining the hollow axle members and provided with fastening means located within the spindles for holding the hollow axle members together, differential gearing carried by the axle, transmission gearing connected to the differential gearing, and a casing inclosing the gearing and the major portion of the axle.

9. In drive axle construction for automobiles, an axle assembly comprising separate hollow axle members with wheel carrying spindles at their outer ends, an interior axle member extending through the hollow members and stopping short of the outer ends of the latter, said interior axle member carrying and joining said hollow members and provided with fastening means located within and housed by the spindles for holding the hollow axle members together, differential gearing carried by the interior and hollow axle members, transmission gearing connected to the differential gearing, a casing inclosing the differential and transmission gearings and also the major portion of the axle, and springs sustained by the casing for in turn sustaining the running gear of the automobile.

10. In automobile construction, a drive axle comprising exterior hollow axle members, an interior one-piece axle member housed by the hollow members extending lengthwise of and beyond the ends of the one-piece member and there formed with wheel carrying spindles, differential gearing on the axle, transmission gearing for driving the axle through the differential gearing, and a casing inclosing the major portion of the axle and all the gearing and provided with antifriction bearings for the axle adjacent to the differential gearing and adjacent to the wheel carrying spindles.

11. In automobile construction, a drive axle comprising exterior hollow axle members, an interior one-piece axle member housed by the hollow members extending lengthwise of and beyond the ends of the one-piece member and there formed with wheel carrying spindles, differential gearing on the axle, transmission gearing for driving the axle through the differential gearing, and a casing inclosing the major portion of the axle and all the gearing and provided with antifriction bearings for the axle adjacent to the differential gearing and adjacent to the wheel carrying spindles, said casing having packing glands about the axle where the latter emerges from the casing beyond those antifriction bearings adjacent to the wheel carrying spindles.

12. In drive axle construction for automobile vehicles, a square face spur gear mounted on the drive axle, differential gears connecting the spur gear with the rear vehicle wheels, a square face spur pinion constantly meshing with the square face spur gear for driving it, and intermeshing bevel gears, one of which is fixed to and drives the square face spur pinion, the spur pinion being located below the top of the square face spur gear.

13. In drive axle construction for automobile vehicles, bevel driving gears, a square face spur pinion mounted on and fast to one of the bevel gears, a rear axle assembly having a central member and wheel-carrying members surrounding and extending beyond the central member, a square face spur gear mounted on the central member of the axle assembly and constantly meshing with the square face spur pinion, bevel spur pinions mounted radially in the web portion of the square face spur gear, and bevel spur gears mounted on the hollow axle members of the rear axle assembly and meshing with the bevel spur pinions carried by the square face spur gear.

14. In drive axle construction for automobiles, a solid central axle member, a driving gear wheel mounted on the solid axle member, means for driving the gear wheel from the motive source of the automobile, bevel pinions radially mounted in the web of the gear wheel, axle members inclosing the central axle member and extending beyond the outer ends of the axle member and there shaped to receive vehicle wheels, and bevel gears fast on the second named axle members and meshing with the bevel pinions.

15. In drive axle construction for automobiles, a solid central axle member tapered from the central portion toward the ends, a driving gear wheel mounted on the intermediate part of the central axle member, bevel pinions mounted radially in the web of the driving gear, other axle members encircling the first named axle member and each provided with a taper bore, said second named axle members extending outwardly beyond the ends of the central axle member and there shaped to receive vehicle wheels, means for holding the axle members together, bevel gear wheels mounted on the inner ends of the second named axle members and meshing with the bevel pinions, and a longitudinally flanged case inclosing the axle members and the driving gear.

16. In a gear drive and rear axle construction for automobiles, the combination with the rear or driving axle assembly, of a square face spur gear mounted on the driving axle assembly, a square face spur pinion in constant mesh with the square face spur gear, a bevel gear wheel fast to and concentric with the square face spur pinion, a bevel pinion for connection with the motive power of the automobile and in constant mesh with the bevel gear wheel, and a lubricant tight case inclosing the several gear wheels, said case being formed of a plurality of parts joined along the lines of the journals of the named gears and pinions and parts carrying them.

17. The combination with a rear or drive axle assembly for automobiles, of a square face spur gear wheel mounted on the rear axle assembly, differential mechanism connecting the gear wheel with the driving wheels of the automobile, a square face spur pinion in constant mesh with the square face gear, a bevel gear wheel concentric with and fast to the square face spur pinion, a bevel pinion for driving said bevel gear wheel and in turn adapted to be driven by the drive shaft of the automobile, and a flanged casing inclosing the several named parts, with the bearings or journals of the drive shaft, square face spur pinion and the vehicle axle in the plane of the flanges of the casing.

18. The combination with a drive axle assembly for automobiles, of a square face spur gear mounted on the rear axle, differential mechanism for connecting the gear with the rear wheels of the vehicle, a square face spur pinion in constant mesh with the gear wheel and in an approximately horizontal plane therewith, a bevel gear wheel concentric with and fast to the square face spur pinion, a bevel pinion for driving the bevel gear wheel, and a casing inclosing all of said gears and formed in parts joined in an approximately horizontal plane to provide bearings for the several gears where the casing parts are joined.

19. The combination with a drive axle assembly for automobiles, of a large square face spur gear on the rear axle, a small square face spur pinion in constant mesh with the large gear wheel and both the gear wheel and pinion having their axes in substantially the same horizontal plane, a large bevel gear concentric with and fixed to the square face pinion with the large bevel gear located entirely below the top of the large square face gear, and an inclosing casing comprising upper and lower parts joined at the meeting edges and formed to provide bearings in the joints.

In testimony that I claim the foregoing as my own I have hereunto affixed my signature in the presence of two witnesses.

ADDISON B. CARLL.

Witnesses:
ELSIE C. DUFF,
CHAS. H. F. WARD.